United States Patent [19]

Marola et al.

[11] 3,993,176

[45] Nov. 23, 1976

[54] OVERRUNNING CLUTCH

[75] Inventors: Americo E. Marola, Torrington; John R. Hull, Litchfield, both of Conn.

[73] Assignee: The Torrington Company, Torrington, Conn.

[22] Filed: Aug. 18, 1975

[21] Appl. No.: 605,632

[52] U.S. Cl. .................................. 192/45; 308/217; 308/233

[51] Int. Cl.² .......................................... F16D 3/34

[58] Field of Search ............. 192/45; 308/217, 233; 188/82.84

[56] References Cited

UNITED STATES PATENTS

| | | | |
|---|---|---|---|
| 3,500,977 | 3/1970 | Gehrke | 192/45 |
| 3,537,554 | 11/1970 | Elmore et al. | 192/45 |
| 3,548,982 | 12/1970 | Soloviev | 192/45 |
| 3,746,136 | 7/1973 | Marola et al. | 192/45 |
| 3,937,312 | 2/1976 | Gehrke | 192/45 |

*Primary Examiner*—M. H. Wood, Jr.
*Assistant Examiner*—Richard A. Bertsch
*Attorney, Agent, or Firm*—Frank S. Troidl

[57] ABSTRACT

The overrunning clutch includes an outer member having at least one radially, inwardly extending flange. The flange includes some means such as a slot, or hole, or projection for cooperating with a spring biasing portion of a cage located in the annular space between the outer member and an inner member of the clutch.

The cage includes a biasing portion for biasing the rolling members in the pockets of the cage. The biasing portion is shaped to cooperate with the slot or hole, or projection in the radially extending flange of the outer member so that the rolling members in the retainer will lock into a cam surface of the outer member when the rolling members are urged in a given rotary direction.

7 Claims, 10 Drawing Figures

OVERRUNNING CLUTCH

This invention is a new and improved overrunning clutch.

In one type of overrunning clutch, an inner member such as a shaft is located in the bore of an outer member, such as a casing or cup, which is provided with cam surfaces. A plurality of rolling members such as rollers are located in the annular space between the shaft and the casing. The cam surface on the inside of the casing is shaped so that when the inner member is rotated in one direction relative to the casing, the shaft will be locked against further rotational movement; whereas when the shaft is rotated in the other direction, the shaft may continue to rotate freely with respect to the casing.

In many overrunning clutches, the rolling members are guided and positioned in pockets of cages with the cages being spring biased by some sort of a spring. This invention is an improvement over currently used overruning clutches, including a cage which is spring biased to exert a force against the rolling members in the pockets of the cage.

Briefly described, our new overruning clutch includes an outer member containing an internal bore and at least one radially, inwardly extending flange. A second member, such as a shaft, is located within the bore and provides an annular space between the shaft and the outer member. A cage in the annular space has pockets for receiving rolling members. At least one rolling member is located in at least one of the pockets. Each pocket may contain one rolling member. There may be more than one rolling member in any pocket or in all pockets. A rolling member biasing portion, such as a slot or an opening, or a projection, or bulged area, or other means, is included as part of the flange on the outer member. This part of the flange is constructed to cooperate with a rolling member biasing portion of the cage. The part of the cage which biases the rolling members rotates the entire clutch cage by pushing against that portion of the inwardly extending flange of the outer member, which cooperates with the cage rolling member biasing portion.

The invention as well as its many advantages may be further understood by reference to the following detailed description and drawings in which.

Like parts in the various figures are referred to by like numbers.

Figure 1:
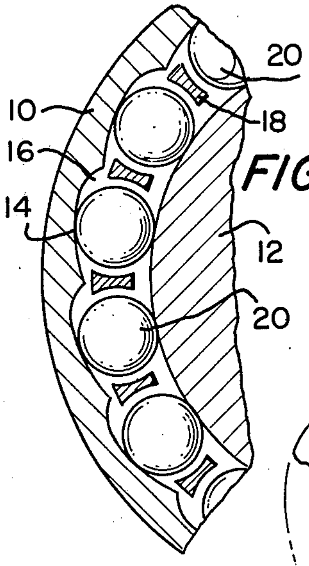
FIG. 1 is a fragmentary view, partly in section, illustrating an overrunning clutch.

Referring to the drawings, and more particularly to FIG. 1, which shows the type of overrunning clutch to which the invention is applicable, the overrunning clutch includes an outer member or casing 10 and an inner member or shaft 12 which may be rotated within the casing 10. The inner periphery of the casing 10 is provided with a cam surface consisting of ramps 14 and a roller stop portion 16. A cage is located in the annular space between the casing 10 and the shaft 12. The cage is provided with axially extending circumferentially separated cage bars 18, which provide pockets for the receipt and retention of the rollers 20.

The space between the outer periphery of the shaft 12 and the ramp 14 is less than the diameter of the rollers 20; whereas the space between the outer perimeter of the shaft 12 and the area adjacent the stop 16 for the cam surface is greater than the diameter of the rollers 20. When the shaft 12 is rotated in a counterclockwise direction, relative to casing 10, looking at FIG. 1, the rollers are immediately moved along ramp 14 to the lockup position. When, however, the shaft 12 is moved in a clockwise direction relative to casing 10, the rollers are also moved in a clockwise direction toward the stops 16 of the cam surface on the casing 10 and since the space between the periphery of the shaft 12 and the inner periphery of the casing 10 at that point is greater than the diameter of the rollers, the shaft 12 will continue to rotate in the clockwise direction.

Figure 3:
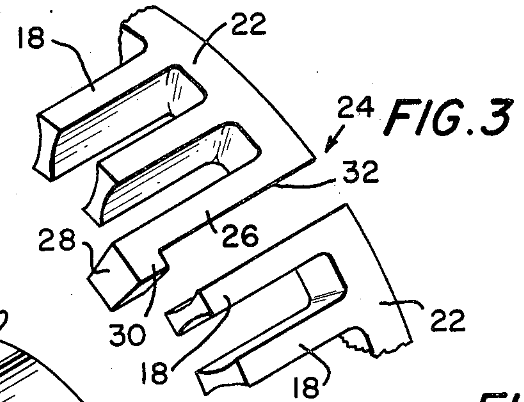
FIG. 3 shows a fragmentary view of an axial drawn molded plastic cage and includes the roller member biasing finger in the flexed position.
Figure 2:
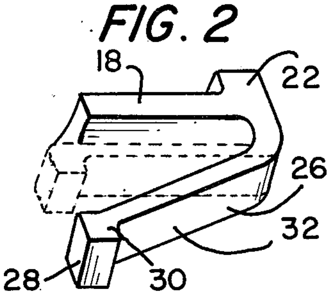
FIG. 2 is a view showing specifically one embodiment of cage finger which is an integral part of the cage.

As shown in FIG. 2 and FIG. 3, one embodiment of this invention includes a finger-type cage which includes an end rim 22 from which the circumferentially separated bars 18 axially extend. The retainer, of course, is annular in shape, but the end rim 22 as shown in FIG. 3, does not extend around a complete circle. A space 24 is provided between a specially constructed integral spring finger 26 and a next adjacent cage bar 18. The end rim may form a complete circle when it is desired.

Figure 4:
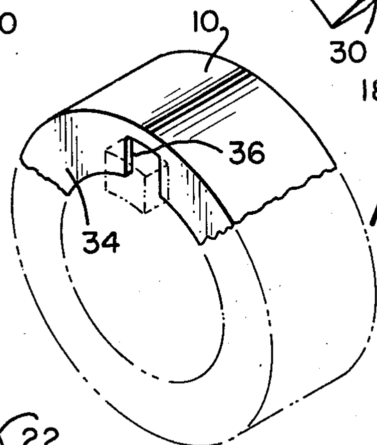
FIG. 4 is a perspective view of the outer member or casing of the overrunning clutch.

A rectangular block portion 28 is located at the open end of the spring portion 26. The rectangular block portion 28 has a projection 30 extending at approximately a right angle from the surface 32 of the spring member 26. As shown in FIG. 4, the casing 10 has a radially, inwardly, extending flange 34. A slot 36 in flange 34 extends radially, outwardly from the inside periphery of the flange 34. The rectangular portion 28 of the spring finger 26 is shaped to fit through the slot 36 in the flange 34 with the projection 30 of the rectangular portion 28 fitting against the flange 34 after the rectangular portion 28 has been inserted through the slot 36.

To assemble the new overrunning clutch the cage with the rollers is put into the casing 10. Alternatively, the rollers may be installed after the cage is placed in the casing. When the cage is put in the casing 10 the rectangular portion 28 of the spring finger 26 is inserted through the slot 36 in the flange 34. Thereafter, the shaft 12 is inserted in the casing and cage and set of rollers. The insertion of the shaft 12 causes the rollers to move circumferentially and thus rotate the cage, causing the energizing integral spring finger 26 to be deflected. The spring tends to cause the entire cage to rotate in the direction of roller lockup. Each bar 18 on the cage individually pushes its roller into the lockup position. Alternatively, each or any bar may push against the first of several rollers which are in side-by-side relationship, the first roller pushing against the next, and so on.

As shown in FIG. 2, before the overrunning clutch has been assembled, the spring finger 26 extends angularly from the rim 22; however, after the overrunning clutch is assembled the flexed position of the spring finger 26 is shown in broken lines.

Figure 5:
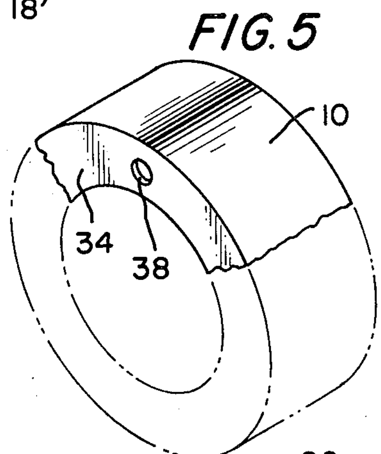
FIG. 5 is a perspective view similar to FIG. 4 showing a second preferred embodiment of outer member structure.
Figure 6:
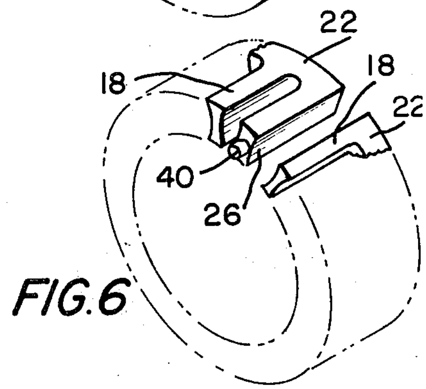
FIG. 6 is a view of a cage which would be used with the outer casing of FIG. 5.

In the embodiment shown in FIG. 5 and FIG. 6, a circular hole 38 is provided through the flange 34 in which a peg 40 (see FIG. 6) extending from the spring finger 26 fits when the overrunning clutch is assembled. The spring finger 26 and peg 40 are shown in FIG. 6 in position after the cage has been inserted in the casing 10 with the peg 40 in the hole 38, and the spring finger 26 has been flexed by the insertion of the shaft.

Figure 7:
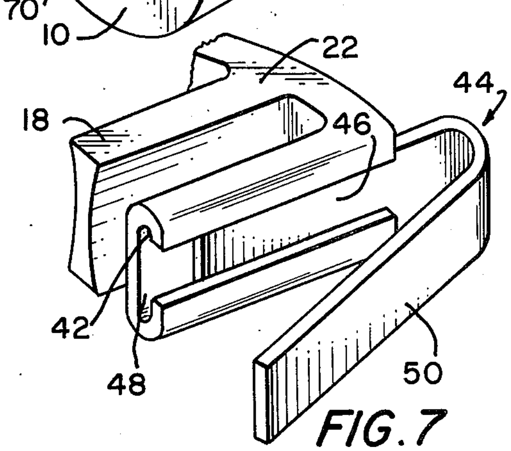
FIG. 7 is a fragmentary enlarged view illustrating another preferred form of cage portion for biasing the rolling members.

In the embodiment of FIG. 7, the finger cage 22 has a specially constructed cage bar 42 into which a generally U-shaped spring 44 is placed. The side 46 of the U-shaped spring 44 is placed in a longitudinal groove 48 in the cage bar 42. The open edge of the other leg 50 of the spring 44 will, of course, extend into a slot (not shown) in the flange of a housing.

Figure 8:
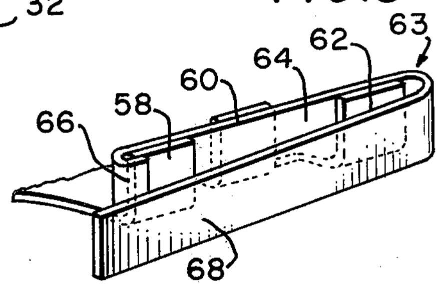
FIG. 8 is a detailed view illustrating still another preferred cage, including the spring biasing member.
Figure 9:
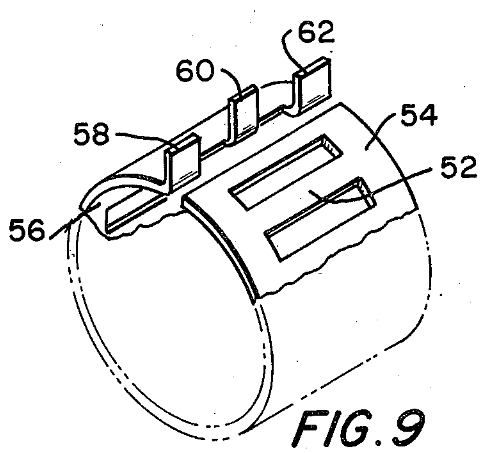
FIG. 9 shows the cage structure in which the separate spring biasing portion of the cage of FIG. 8 is used.

In all of the embodiments shown in FIGS. 2 through 7 the cage is preferably formed of molded plastic in an axial drawn mold. It may also be formed or molded by other methods. However, if desired, the cage may be formed of a metal material. For example, in the embodiment shown in FIG. 8 and FIG. 9, the cage may be made of flat metal stock wrapped up into an annular shape (see FIG. 9). In this embodiment the cage is not a finger-type cage, although it may be, but rather includes a plurality of bars 52 extending between two end rims 54 and 56. Three radially, outwardly extending tabs 58, 60 and 62 are provided at one circumferential edge of the annularly wrapped metal stock. Tabs 58 and 62 are circumferentially along the same plane; whereas tab 60 is circumferentially spaced a short distance from tabs 58 and 62. A generally U-shaped spring 63 has one leg 64 nestled between the tab 60 and the tabs 58 and 62. The outer edge of the leg 64 may be provided with a curled end portion 66 which fits around the tab 58, thus keeping the U-shaped spring in place. The leg 68 of U-shaped spring 63 has its outer edge placed in an opening (not shown) in a flange of the outer casing (not shown) or against a projection on the flange.

Figure 10:
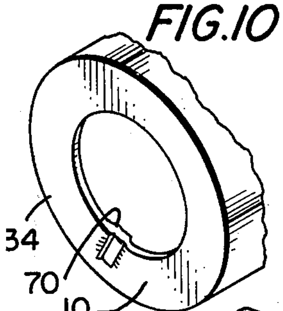
FIG. 10 is a perspective view showing another preferred embodiment of the outer member structure.

In the embodiment of FIG. 10, a projection 70 is formed axially inward. The cage spring finger, short enough to fit inside the casing but long enough so it cannot slip past the projection, acts against the projection to rotate the cage.

We claim:

1. An overrunning clutch comprising: an outer member containing an internal bore and at least one radially, inwardly extending flange; a second member located within said bore and having a smaller outside diameter than the diameter of said bore to provide an annular space between said members; a cage in said annular space with pockets for receiving rolling members; at least one rolling member in at least one of said pockets; a rolling member biasing portion included as a part of the cage; biasing portion cooperating means on the radially, inwardly extending flange adapted to cooperate with the rolling member biasing portion of the cage for biasing the rolling members; the outer member having a plurality of cam surfaces for cooperating with the rolling members to wedge and lock said rolling members between said outer and inner members when said rolling members are urged in a given rotary direction.

2. The overrunning clutch of claim 1 wherein: the biasing portion is an integral part of the cage, the biasing portion cooperating means is an opening in the flange and the biasing portion of the cage has an axial end shaped to fit in the opening.

3. The overrunning clutch of claim 2 wherein the opening is a rectangular opening.

4. The overrunning clutch of claim 2 wherein the opening is a circular hole.

5. The overrunning clutch of claim 1 wherein the biasing portion cooperating means on the radially inwardly extending flange is an inward projection.

6. The overrunning clutch of claim 1 wherein: the biasing portion of the cage includes a bar of the cage having a longitudinally extending slot and a U-shaped metal spring with one side inserted in said slot, the biasing portion cooperating means on the flange cooperating with the biasing portion of the cage is a slot in the flange, and the other side of the U-shaped metal spring extends into the slot of the flange.

7. An overrunning clutch in accordance with claim 1 wherein: the cage is made of flat metal stock wrapped into an annular shape, said cage has a plurality of radially extending tabs adapted to receive one side of a generally U-shaped spring at one circumferential edge, a generally U-shaped spring has one side fitted between said radially extending tabs and the biasing portion cooperating means on the flange cooperating with the biasing portion of the cage is a slot and the other side of the U-shaped spring extends into the slot.

* * * * *